(12) United States Patent
Torata et al.

(10) Patent No.: US 8,431,267 B2
(45) Date of Patent: Apr. 30, 2013

(54) NONAQUEOUS SECONDARY BATTERY

(75) Inventors: Naoto Torata, Osaka (JP); Naoto Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 25 days.

(21) Appl. No.: 13/018,797

(22) Filed: Feb. 1, 2011

(65) Prior Publication Data

US 2011/0189530 A1    Aug. 4, 2011

(30) Foreign Application Priority Data

Feb. 1, 2010  (JP) ................. 2010-020416

(51) Int. Cl.
   *H01M 4/58*   (2010.01)

(52) U.S. Cl.
   USPC .......................... 429/144; 156/285

(58) Field of Classification Search ............ 429/144, 429/231.8; 156/285
   See application file for complete search history.

(56) References Cited

U.S. PATENT DOCUMENTS

2011/0059364 A1*  3/2011  Zhang et al. ............... 429/231.8

FOREIGN PATENT DOCUMENTS

JP            11-16566         1/1999

* cited by examiner

*Primary Examiner* — Mark F Huff
*Assistant Examiner* — Monique Wills
(74) *Attorney, Agent, or Firm* — Nixon & Vanderhye P.C.

(57) ABSTRACT

A nonaqueous secondary battery comprising a pair of electrodes consisting of a positive electrode and a negative electrode, and a separator interposed between the pair of electrodes, wherein the separator is a laminate formed by stacking in sequence a metal layer, a first resin layer and a second resin layer having a thermal shrinkage percentage smaller than a thermal shrinkage percentage of the first resin layer, and the metal layer is opposed to one of the pair of electrodes.

6 Claims, 1 Drawing Sheet

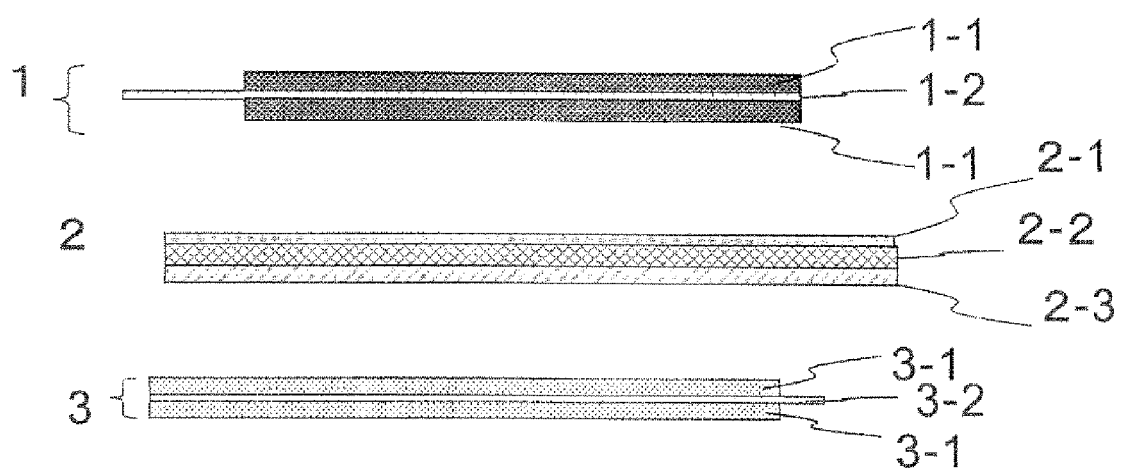

NONAQUEOUS SECONDARY BATTERY

CROSS-REFERENCE TO RELATED APPLICATION

This application is related to Japanese application No. 2010-20416 filed on Feb. 1, 2010, whose priority is claimed under 35 USC §119, the disclosure of which is incorporated by reference in its entirety.

BACKGROUND OF THE INVENTION

1. Field of the Invention

The present invention relates to a nonaqueous secondary battery. More particularly, the present invention relates a nonaqueous secondary battery, such as a lithium-ion secondary battery, having excellent battery characteristics and being improved in safety.

2. Description of the Related Art

A nonaqueous secondary battery in which a metal oxide is used as a positive electrode, an organic electrolytic solution is used as an electrolyte, a carbon material such as graphite is used as a negative electrode, and a porous separator is used between the positive electrode and the negative electrode, such as a lithium-ion secondary battery, was first manufactured as a product in 1991. Since then, having higher energy density, the nonaqueous secondary battery has become rapidly widespread as a battery for a mobile instrument such as a mobile telephone which has been reducing in size and weight.

In addition, a lithium-ion secondary battery (large-capacity battery) having enlarged capacity to store power generated has been studied. As the large-capacity battery, there has been announced a battery manufactured by merely upsizing a conventional battery for the use in a mobile instrument.

In the lithium-ion secondary battery, an organic electrolytic solution is used as an electrolyte. Some measures are therefore taken to the battery to prevent incidents such as rupture and catching fire even under harsh use conditions. One of the measures is a "shutdown function", that is, when the battery temperature rises, a separator melts to close holes of the separator to interrupt the current.

However, even a lithium-ion secondary battery to which such measures are taken experiences some problems associated with the safety of the battery. For example, when short circuit is caused by an external obstacle (such as penetration of a nail) or short circuit is caused by an internal obstacle (such as contamination by a foreign matter), the current flow is concentrated in the short-circuited part. The concentrated current causes resistance heating in the battery. The heating causes a chemical reaction of an active material or the electrolytic solution in the battery. As a result, so-called "thermal runaway" occurs in the battery. In the worst case, the battery comes to be ruptured or catch fire.

Japanese Unexamined Patent Publication No. HEI 11 (1999)-16566 proposes a solution for the above-described problem. Specifically, the publication proposes use of a separator in which a surface facing a positive electrode is coated with a metal having excellent oxygen absorption capacity selected from Ti, Al, Sn, Bi, Cu, Si, Ga, W, Zr, B and Mo; and/or a intermetallic compound formed by combining two or more of these metals; and/or an oxide of these metals.

SUMMARY OF THE INVENTION

Thus, the present invention provides a nonaqueous secondary battery comprising a pair of electrodes consisting of a positive electrode and a negative electrode, and a separator interposed between the pair of electrodes, wherein the separator is a laminate formed by stacking in sequence a metal layer, a first resin layer and a second resin layer having a thermal shrinkage percentage smaller than a thermal shrinkage percentage of the first resin layer, and the metal layer is opposed to one of the pair of electrodes.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is an exploded view of an essential part of a nonaqueous secondary battery of the present invention.

DESCRIPTION OF THE PREFERRED EMBODIMENTS

The above-mentioned publication alleges that safety can be ensured by absorbing oxygen, which will be a factor of catching fire/rupture, generated from the positive electrode by means of the metal having excellent oxygen absorption capacity in the separator and covering the positive electrode. However, in the abnormal event of internal short circuit, in particular, in the abnormal event of abrupt temperature rise, the effect of ensuring safety cannot be produced.

In view of the above-described problems, the present invention has been achieved to provide a nonaqueous secondary battery being improved in safety even in the event of externally caused short circuit or short circuit caused by a foreign matter in the battery.

A nonaqueous secondary battery (hereinafter, also simply referred to as battery) of the present invention comprises: a pair of electrodes consisting of a positive electrode and a negative electrode; and a separator interposed between the pair of electrodes. Examples of the nonaqueous secondary battery referred to include lithium-ion secondary batteries, metal lithium secondary batteries and lithium polymer secondary batteries.

Furthermore, in the present invention, a laminate formed by stacking a metal layer, a first resin layer, a second resin layer having a thermal shrinkage percentage smaller than a thermal shrinkage percentage of the first resin layer in this order is used as the separator.

Having the metal layer and the first resin layer, the battery can have the following function. That is, short circuit can be caused between the positive electrode and the metal layer or between the negative electrode and the metal layer before short-circuit is caused by interposition of a foreign matter between the positive electrode and the negative electrode, for example. Heat is generated due to the short circuit between the positive electrode and the metal layer or between the negative electrode and the metal layer to shrink the first resin layer to increase the resistance between the positive electrode and the negative electrode. Thereby, the current flowing between the positive electrode and the negative electrode can be interrupted. Having the second resin layer, furthermore, the battery can prevent increase in an area of the short circuit (short-circuit area) between the positive electrode and the metal layer or between the negative electrode and the metal layer as a result of the shrinkage of the first resin layer. In particular, the current can be readily interrupted against rapid temperature rise. As a result, it is possible to obtain a battery improved in safety.

The metal layer may be opposed to either the positive electrode or the negative electrode, and preferably opposed to the positive electrode. This is because internal short circuit due to dissolution/precipitation of a precipitate occurs when the precipitate that has emerged at the negative electrode side reaches the positive electrode.

FIG. 1 is an exploded view of an essential part (the positive electrode, the separator and the negative electrode) of the nonaqueous secondary battery of the present invention when the metal layer is opposed to the positive electrode. Hereinafter, the battery of the present invention will be described based on FIG. 1. In FIG. 1, elements that are the same or corresponding to each other will be denoted by the same reference numeral. In FIG. 1, the relative dimension including length, size and width of each element is changed appropriately for clarification and simplification of the drawing; actual dimension is not shown.

The battery illustrated in FIG. 1 comprises a positive electrode 1, a negative electrode 3 and a separator 2 interposed between the positive electrode 1 and the negative electrode 3. The separator 2 is a laminate of a metal layer 2-1, a first resin layer 2-2 and a second resin layer 2-3 stacked in this order.

The first resin layer 2-2 and the second resin layer 2-3 are measured for the thermal shrinkage percentage preferably at 150° C. This measurement temperature is determined from the viewpoint of the temperature of the shutdown function of the resin layer.

The thermal shrinkage percentage is calculated as follows. First, two points are marked on the resin layer at an interval of 50 [mm] or more, and the distance between the points is measured with a slide gauge. Subsequently, the resin layer is heated at a constant temperature for a predetermined period of time (for example, at 150° C. for 300 seconds), and then the distance between the same points is measured again. The ratio (percentage) of the distance between the points after the heating to the distance between the points before the heating is calculated. This ratio is determined as the thermal shrinkage percentage between the set of points. According to this method, three sets of points are selected for a longitudinal direction of the resin layer and three sets of points are selected for a lateral direction of the resin layer to be measured for the thermal shrinkage percentage. Using the thermal shrinkage percentages obtained for the respective sets of points, the average thermal shrinkage percentage of the longitudinal direction and the average thermal shrinkage percentage of the lateral direction are calculated. The larger average thermal shrinkage percentage of the two average thermal shrinkage percentages obtained is determined as the thermal shrinkage percentage in the present specification. Here, when the resin layer is in a film-like and rolled state, for example, the longitudinal direction means a longitudinal direction of the roll and the lateral direction means a direction of the rolling.

Preferably, the thermal shrinkage percentage of the first resin layer is 5% or more at 150° C.

Preferably, the thermal shrinkage percentage of the second resin layer is 1% or less at 150° C. More preferably, the thermal shrinkage percentage is 0% to 0.5%. Even more preferably, the thermal shrinkage percentage is 0% to 0.1%.

Preferably, the difference in the thermal shrinkage percentage between the first resin layer and the second resin layer is 5% or more at 150° C. More preferably, the difference in the thermal shrinkage percentage is 5% or more.

Examples of the first resin layer of the separator include polyolefin resins (for example, polyethylene, polypropylene, and copolymer of polyethylene and polypropylene) and polystyrene resins.

The second resin layer can be appropriately selected from, for example, a synthetic resin fiber layer, a glass fiber layer, a nonwoven fabric of a natural fiber, a woven fabric and a microporous film. This resin layer usually has electrical insulation properties. Out of these examples, a nonwoven fabric of polyester, aramid resin, glass fiber or cellulose resin; and a microporous film are preferable in terms of the stability in the quality.

The first resin layer and the second resin layer do not need to be physically or chemically combined; they can be simply stacked and combined by a certain way such as fusion to be a composite resin layer.

The metal layer is not particularly limited, as long as it is a layer formed of a metal capable of inhibiting deformation of the first resin layer when the metal layer is on a surface of the first resin layer. Preferable examples thereof include metal layers of nickel (Ni), gold (Au), aluminum (Al) and copper (Cu). These specific layers are advantageous in that formation of the metal layer is easy.

Preferably, the thickness of the metal layer is 2 μm or less. When the thickness is more than 2 μm, maintenance of the shape of the resin layer may be difficult. For example, the thickness is 1.8 μm or less, 1.6 μm or less, 1.4 μm or less, 1.2 μm or less, 1.0 μm or less, or 0.9 μm or less. More preferably, the thickness is 0.50 μm or less. Even more preferably, the thickness is 0.01 μm to 0.50 μm. Examples of the method for forming the metal layer on a surface of the resin layer include plating, vapor deposition and metal spraying. In particular, the resin layer is preferably coated with the metal layer by plating, because the method has less impact on the form of the separator in terms of processing.

The thickness of the separator (total thickness of the metal layer, the resin layer having the larger thermal shrinkage percentage and the resin layer having the smaller thermal shrinkage percentage) is not particularly limited, as long as it is enough to retain a necessary amount of electrolytic solution and prevent short circuit between the positive electrode and the negative electrode, for example. Specifically, the thickness of the separator is approximately 0.01 mm to 1 mm, and preferably it is approximately 0.02 mm to 0.05 mm. Preferably, the air resistance of the separator is 1 sec/cm$^3$ to 500 sec/cm$^3$ in order to ensure the strength enough to prevent internal short circuit in the battery while sustaining a low internal resistance of the battery.

The shape of the separator is not particularly limited, and examples thereof include a quadrilateral shape such as square and rectangle; a polygon; and a circle. In particular, the separator preferably has a shape similar to the outer shapes of the positive electrode and the negative electrode.

Preferably, the size of the separator is larger than the size of the positive electrode, when the positive electrode, the separator and the negative electrode are stacked in this order. More preferably, the size of the separator is larger than the size of the positive electrode and smaller than the size of the negative electrode.

The positive electrode 1 provides a positive electrode layer 1-1 and a positive-electrode current collector 1-2. In FIG. 1, the positive electrode layer 1-1 is formed on both surfaces of the positive-electrode current collector 1-2. This is to increase the capacity of the battery by stacking a plurality of cells each comprising a positive electrode/separator/negative electrode structure.

The positive electrode layer is a layer formed from metal lithium or containing a positive-electrode active material. Preferably, in particular, the positive electrode layer is a layer containing a safer positive-electrode active material.

Examples of the positive-electrode active material include lithium-containing oxides. Specific examples thereof include $LiCoO_2$, $LiNiO_2$, $LiFeO_2$, $LiMnO_2$, $LiMn_2O_4$ and materials in which the transition metals of these positive-electrode active materials are partially substituted with other metal elements (for example, Co, Ni, Fe, Mn, Al and Mg). In particular, problems due to overcharge can be resolved and the safety can be enhanced by using 80% or more of the amount of lithium contained in the positive-electrode active material for a battery reaction during normal operation. Examples of the positive-electrode active material in which such an amount of lithium can be used include those having a spinel structure such as $LiMn_2O_4$ and those having an olivine structure such as $LiMPO_4$, wherein M represents at least one or more kinds of elements selected from Co, Ni, Mn and Fe). In particular, a positive-electrode active material containing Mn and/or Fe is preferable in terms of cost saving.

More preferable examples of the positive-electrode active material include $LiFePO_4$ in terms of safety and charging voltage. The other positive-electrode active materials usually release oxygen when temperature rises and burn the electrolytic solution to cause more intense heat generation. In $LiFePO_4$, meanwhile, all the oxygen atoms are linked to the phosphorus atom by a strong covalent bond. $LiFePO_4$ is therefore preferable in terms of safety as being least likely to release oxygen when temperature rises. Besides, $LiFePO_4$ is expected to produce an extinction effect as containing phosphorus. Further, $LiFePO_4$ needs a charging voltage of approximately 3.5 V, and charging operation is substantially completed at 3.8 V, leaving some voltages before reaching a voltage that causes decomposition of the electrolytic solution (for example, 5.0 V). Even if load characteristics defined by the battery include polarization of the electrodes, therefore, it is possible to charge the battery by increasing the charging voltage. Thus, $LiFePO_4$ is particularly preferable.

When a positive-electrode active material needing a charging voltage of 4 V or more (for example, $LiCoO_2$ and $LiMn_2O_4$) is used and the charging voltage is further increased, the decomposition of the electrolytic solution will be more likely. When the polarization is large as described above, therefore, the charging operation performed at an increased charging voltage may affect cycle characteristics. Besides, the voltage of a battery using $LiFePO_4$ abruptly increases at the end of the charging operation to allow very easy detection of full charge. Even when a plurality of batteries are assembled, $LiFePO_4$ is advantageous in that voltage detection is not required to be so accurate.

The positive electrode layer containing the positive-electrode active material usually contains a binder in order to maintain the positive-electrode active material as a layer.

Examples of the binder include fluoropolymers such as polyvinylidene fluoride (PVDF), polyvinyl pyridine and polytetrafluoroethylene; polyolefin polymers such as polyethylene and polypropylene; and styrene-butadiene rubber.

The positive electrode layer may further contain a conductive material and a thickener.

As the conductive material, a chemically stable one is preferably used. Specific examples thereof include carbonaceous materials such as carbon black, acetylene black, ketjen black, graphites (natural graphite and artificial graphite) and carbon fiber; and conductive metal oxides.

Examples of the thickener include polyethylene glycols, celluloses, polyacrylamides, poly-N-vinylamides and poly-N-vinylpyrrolidones. Out of them, polyethylene glycols, and celluloses such as carboxymethylcellulose (CMC) are preferable, and CMC is particularly preferable.

The mixing ratio among the binder, the thickener and the conductive material is dependent on the kinds of the binder, the thickener and the conductive material to mix, and approximately 1 part by weight to 50 parts by weight of the binder, approximately 0.1 parts by weight to 20 parts by weight of the thickener and approximately 0.1 parts by weight to 50 parts by weight of the conductive material may be mixed with respect to 100 parts by weight of the positive-electrode active material. When the binder is less than approximately 1 part by weight, the binding ability may be insufficient. When the binder is more than approximately 50 parts by weight, the amount of the active material contained in the positive electrode may decrease, and the resistance or the polarization of the positive electrode may be larger to decrease the discharge capacity. When the thickener is less than approximately 0.1 parts by weight, the thickening ability may be insufficient. When the thickener is more than approximately 20 parts by weight, the amount of the active material contained in the positive electrode may decrease, and the resistance or the polarization of the positive electrode may be larger to decrease the discharge capacity. When the conductive material is less than approximately 0.1 parts by weight, the resistance or the polarization of the electrode may be larger to decrease the discharge capacity. When the thickener is more than approximately 50 parts by weight, the amount of the active material contained in the electrode may decrease to decrease the discharge capacity as the positive electrode.

For the positive-electrode current collector, a well-known material may be appropriately used; examples thereof include a metal foil such as aluminum, stainless, titanium, copper, nickel, iron, zinc, gold and platinum. Out of them, aluminum is preferable for the positive-electrode current collector as having higher oxidation resistance. In general, the thickness of the positive-electrode current collector may be approximately 12 μm.

The negative electrode 3 provides a negative electrode layer 3-1 and a negative-electrode current collector 3-2. In FIG. 1, the negative electrode layer 3-1 is formed on both surfaces of the negative-electrode current collector 3-2. This is to increase the capacity of the battery by stacking a plurality of cells each having a positive electrode/separator/negative electrode structure.

The negative electrode layer contains a negative-electrode active material. Examples of the negative-electrode active material include natural graphites; particulate (flake, massive, fibrous, whisker, spherical, fracture) synthetic graphites; high crystalline graphites represented by graphitized products such as mesocarbon microbeads, mesophase pitch powder and isotropic pitch powder; and non-graphitizable carbons such as resin sintered carbons. These negative-electrode active materials may be used independently or in combination of two or more kinds thereof. Further, alloy-based materials having a larger capacity such as a negative-electrode active material of tin oxide and, silicon type materials may be used.

The negative electrode layer may further contain additives such as a conductive material, a binder and a thickener.

Examples of the conductive material include carbonaceous materials such as acetylene black (AB) and ketjen black (KB). Examples of the binder include polyvinylidene fluoride, polyvinyl pyridine, polytetrafluoroethylene and styrene-butadiene rubber. The same thickeners as in the positive electrode layer may be used for the negative electrode layer.

For the negative-electrode current collector, a well-known material may be appropriately used; examples thereof include a metal foil such as copper, nickel, iron, aluminum, zinc, gold and platinum. Out of them, copper is preferable for the negative-electrode current collector as being less prone to alloying with lithium. In general, the thickness of the negative-electrode current collector may be approximately 12 µm.

In the battery of the present invention, a nonaqueous electrolyte solution is used. Examples of the nonaqueous electrolyte solution include a solution formed by dissolving an electrolyte salt in an organic solvent.

Examples of the organic solvent include cyclic carbonates such as propylene carbonate (PC), ethylene carbonate (EC) and butylene carbonate; linear carbonates such as dimethyl carbonate, diethyl carbonate, ethyl methyl carbonate and dipropyl carbonate; lactones such as γ-butyrolactone and γ-valerolactone; furans such as tetrahydrofuran and 2-methyltetrahydrofuran; ethers such as diethyl ether, 1,2-dimethoxyethane, 1,2-diethoxyethane, ethoxymethoxyethane and dioxane; dimethyl sulfoxide; sulfolane; methylsulfolane; acetonitrile; methyl formate; methyl acetate; and ionic liquid. These organic solvents may be used independently or in combination of two or more kinds thereof.

Examples of the electrolytic salt include lithium salts such as lithium borofluoride ($LiBF_4$), lithium phosphofluoride ($LiPF_6$), lithium trifluoromethanesulfon ($LiCF_3SO_3$), lithium trifluoroacetate ($LiCF_3COO$) and lithium trifluoromethanesulfonyl imide ($LiN(CF_3SO_2)_2$). These electrolytic salts may be used independently or in combination of two or more kinds thereof.

In addition, a gel electrolyte retaining an nonaqueous electrolyte solution in a polymer matrix may be used.

The battery of the present invention may be held in an outer can. Preferably, a metal, in particular, a material formed by nickel-plating iron is use for the outer can. This is because the strength of the outer can be maintained at low cost. Other examples of the material include stainless steel and aluminum. The outer can may be in any shape such as a thin-flat-barrel type, a cylindrical type and a square-barrel type. In the case of a large-sized lithium secondary battery, a thin-flat type or a square type is preferable, because it is often used as an assembled battery.

The shape of the lithium-ion secondary battery has been restricted by the shape of its battery can. Accordingly, the mainstream shape of the battery has been a "wound type", focusing on productivity, in which a strip positive electrode, a strip negative electrode and a strip separator are wound. On the other hand, a battery of a "stack type" in which the above-described set of elements are stacked can be suitably used for a large-capacity battery.

Further, the battery of the present invention may be held in a bag made from a resin film.

The above-mentioned materials are merely examples, and the present invention is not limited to the examples; any materials known in the field of nonaqueous secondary batteries may be used.

EXAMPLES

The present invention will be described in detail with reference to examples, but the present invention is not limited to the examples.

Examples 1 to 3 and Comparative Example 1

A paste for formation of a positive electrode was prepared by using 100 parts by weight of $LiMn_2O_4$ as a positive-electrode active material, 10 parts by weight of a conductive material (DENKA BLACK, product by DENKI KAGAKU KOGYO KABUSHIKI KAISHA), 10 parts by weight of PVDF (KF polymer, registered trademark, product by KUREHA CORPORATION) as a binder and N-methyl-2-pyrrolidone (hereinafter, referred to as NMP) as a solvent. An aluminum foil having a thickness of 20 µm as a positive-electrode current collector was coated with the paste at both sides, sufficiently dried, and then pressed to obtain a positive electrode including a positive electrode layer (size of the coating area: 200 mm in width×150 mm in length).

Next, a paste for formation of a negative electrode was prepared by using 100 parts by weight of natural graphite made in China (average particle diameter: 15 m, d002=0.3357 nm, BET specific surface area: 3 m$^2$/g) as a negative-electrode active material, 12 parts by weight of PVDF as a binder and NMP as a solvent. A copper foil as a negative-electrode current collector was coated with the paste at both sides, sufficiently dried, and then pressed to obtain a negative electrode including a negative electrode layer (size of the coating area: 205 mm in width×158 mm in length).

A second resin layer formed from a nonwoven fabric of aramid resin having a width of 205 mm, a length of 258 mm and a thickness of 35 µm (BLC1420, product by Japan Vilene Company, thermal shrinkage percentage: 0.1% or less at 150° C.; hereinafter, referred to as aramid resin layer); and a first resin layer formed from polyolefin resin (thermal shrinkage percentage: 10% or more at 150° C.; hereinafter, referred to as polyolefin resin layer) having an Al layer having a thickness of 0.02 µm (Example 1), 0.20 µm (Example 2), 0.50 µm (Example 3) or 1.00 µm (Comparative Example 1) formed on a surface thereof by vapor deposition (hereinafter, surface-Al-vapor-deposited polyolefin resin layer) were stacked to form a laminate as a separator of each example.

The separator, the positive electrode and the negative electrode were stacked in the following order: negative electrode/ aramid resin layer/surface-Al-vapor-deposited polyolefin resin layer/positive electrode/surface-Al-vapor-deposited polyolefin resin layer/aramid resin layer/negative electrode/ aramid resin layer/surface-Al-vapor-deposited polyolefin resin layer/positive electrode/surface-Al-vapor-deposited polyolefin resin layer/aramid resin layer/negative electrode/ aramid resin layer/surface-Al-vapor-deposited polyolefin resin layer/positive electrode/surface-Al-vapor-deposited polyolefin resin layer/aramid resin layer/negative electrode/ aramid resin layer/surface-Al-vapor-deposited polyolefin resin layer/positive electrode/surface-Al-vapor-deposited polyolefin resin layer/aramid resin layer/negative electrode/ aramid resin layer/surface-Al-vapor-deposited polyolefin resin layer/positive electrode/surface-Al-vapor-deposited polyolefin resin layer/aramid resin layer/negative electrode to obtain battery elements for 6 cells. Further, tab-welding was performed on each of the positive and negative electrodes. The battery elements formed were inserted in a can.

As an electrolytic solution, 1.5 M of $LiPF_6$ was dissolved in a solvent formed by mixing ethylene carbonate (EC) and dimethyl carbonate (DMC) in a volume ratio of 1:1. The electrolytic solution was injected into the can, and the can was maintained under reduced pressure. Subsequently, the can was returned to atmospheric pressure, and the outer periphery of a lid thereof was sealed to produce each battery.

In Comparative Example 1, the separator was deformed to fail to obtain a cell, as the Al layer is formed by vapor deposition.

The other batteries formed were subjected to a charging and discharging test, and a nail penetration test under the following conditions.

Condition for Charging and Discharging Test

Evaluation was carried out under the following condition: Charging: Constant-current constant-voltage charging was carried out at a charging current of 0.2 C and a final voltage of 4.2 V, and cutoff after 20 hours or at a charging current of 10 mA. Discharging: Discharging was carried out at a discharging current of 0.2 C, 0.5 C and 1 C, and cutoff at a final voltage of 3.0 V. The discharge capacity was determined by a period of time taken while the discharging was carried out until the voltage reached 3.0 V.

Condition for Nail Penetration Test

After the above-described charging and discharging test, each of the batteries was subjected to a nail penetration test using a nail having a diameter of 2.5 mm while in a full charge state, and the behavior and the surface temperature of the battery were observed.

Comparative Example 2

A battery was produced in the same manner as in Example 1 except that only the polyolefin resin layer (thermal shrinkage percentage: 10% or more at 150° C.) was used as the separator. The battery formed was subjected to the charging and discharging test, and the nail penetration test under the same conditions as in Example 1.

Table 1 shows measurement result of the charging and discharging test, and the nail penetration test performed on the secondary batteries of Examples 1 to 3 and Comparative Example 2.

TABLE 1

| | 1.0 C/0.2 C Capacity ratio | Result of Nail penetration test Behavior | Max surface temperature |
|---|---|---|---|
| Example 1 | 0.91 | Unchanged | 67° C. |
| Example 2 | 0.89 | Unchanged | 62° C. |
| Example 3 | 0.87 | Unchanged | 58° C. |
| Comparative Example 2 | 0.93 | Cell was swollen immediately after nail penetration, ruptured and caught fire. | Unmeasurable |

Table 1 has revealed that the secondary batteries of Examples 1 to 3 including the separator having the metal layer on a surface of the porous resin layer are improved in safety, confirming that the secondary batteries of Examples 1 to 3 are comparable in battery characteristics to the battery of Comparative Example 2 in the charging and discharging test and more inhibited in terms of the rate of temperature rise to reach the maximum surface temperature and the maximum surface temperature to be reached compared with the battery of Comparative Example 2 in the nail penetration test.

According to the nonaqueous secondary battery of the present invention, short circuit is caused between the metal layer and one of the positive electrode and the negative electrode before overcharge or a foreign matter in the battery short-circuits the electrodes, and heat generated by the short circuit causes thermal shrinkage of the first resin layer having a larger thermal shrinkage percentage thereby to increase the resistance between the positive electrode and the negative electrode. In addition, the second resin layer having a smaller thermal shrinkage percentage prevents increase in the short-circuit area. As a result, the safety of the battery can be improved.

When the separator provides the metal layer so as to oppose to the positive electrode, it is possible to increase the resistance between the positive electrode and the negative electrode, and prevent increase in the short-circuit area more effectively.

When the separator is a laminate formed by stacking in sequence the metal layer, the first resin layer having a thermal shrinkage percentage of 5% or more at 150° C. in either the longitudinal or lateral direction and the second resin layer, it is possible to increase the resistance between the positive electrode and the negative electrode, and prevent increase in the short-circuit area more effectively.

When the separator is a laminate formed by stacking in sequence the metal layer, the first resin layer and the second resin layer having a thermal shrinkage percentage of 1% or less at 150° C. in either the longitudinal or lateral direction, it is possible to increase the resistance between the positive electrode and the negative electrode, and prevent increase in the short-circuit area more effectively.

When the separator is a laminate formed by stacking in sequence the metal layer; the first resin layer having a larger thermal shrinkage percentage and containing polyethylene, polypropylene, copolymer of polyethylene and polypropylene, or polystyrene; and the second resin layer having a smaller thermal shrinkage percentage and containing polyester, aramid resin, glass fiber or cellulose resin, it is possible to increase the resistance between the positive electrode and the negative electrode and prevent increase in the short-circuit area more effectively.

What is claimed is:

1. A nonaqueous secondary battery comprising a pair of electrodes consisting of a positive electrode and a negative electrode, and a separator interposed between the pair of electrodes,
   wherein the positive electrode comprises a positive electrode layer and a positive electrode current collector,
   wherein the negative electrode comprises a negative electrode layer and a negative electrode current collector, and
   wherein the separator is a laminate formed by stacking in sequence a metal layer, a first resin layer and a second resin layer having a thermal shrinkage percentage smaller than a thermal shrinkage percentage of the first resin layer, and the metal layer is opposed to the positive electrode,
   wherein the nonaqueous secondary battery is a lithium-ion secondary battery wherein the metal and the positive electrode current collector are two separate elements.

2. The nonaqueous secondary battery of claim 1, wherein the separator is a laminate formed by stacking in sequence the metal layer, the first resin layer having a thermal shrinkage percentage of 5% or more at 150° C. in either the longitudinal or lateral direction and the second resin layer.

3. The nonaqueous secondary battery of claim 1, wherein the separator is a laminate formed by stacking in sequence the metal layer, the first resin layer and the second resin layer having a thermal shrinkage percentage of 1% or less at 150° C. in either the longitudinal or lateral direction.

4. The nonaqueous secondary battery of claim 1, wherein the separator is a laminate formed by stacking in sequence the metal layer; the first resin layer having a larger thermal shrinkage percentage and containing polyethylene, polypropylene, copolymer of polyethylene with polypropylene, or polystyrene; and the second resin layer containing polyester, aramid resin, glass fiber or cellulose resin.

5. The nonaqueous secondary battery of claim 1, wherein the difference in the thermal shrinkage percentage between the first resin layer and the second resin layer is 5% or more.

6. The nonaqueous secondary battery of claim 1, wherein the thickness of the metal layer is 0.50 μm or less.

* * * * *